(12) United States Patent
Stacy et al.

(10) Patent No.: US 7,478,022 B1
(45) Date of Patent: Jan. 13, 2009

(54) COMPONENT EMULATION DEVICE AND METHOD OF DESIGN

(75) Inventors: Douglas Stacy, Greenville, RI (US); Neil Stanick, Northbridge, MA (US)

(73) Assignee: EMC Corporation, Hopkinton, MA (US)

( * ) Notice: Subject to any disclaimer, the term of this patent is extended or adjusted under 35 U.S.C. 154(b) by 550 days.

(21) Appl. No.: 10/910,076

(22) Filed: Aug. 3, 2004

(51) Int. Cl.
  *G06F 9/455* (2006.01)
  *G06F 12/00* (2006.01)
  *H04M 3/24* (2006.01)

(52) U.S. Cl. .............................. 703/7; 703/28; 438/15; 438/685; 360/78.06

(58) Field of Classification Search ................... 703/14, 703/17, 18, 5, 7, 28; 711/4; 714/46, 49; 438/15, 685; 360/78.06
See application file for complete search history.

(56) References Cited

U.S. PATENT DOCUMENTS

| | | | |
|---|---|---|---|
| 5,233,611 A * | 8/1993 | Triantafyllos et al. ........ 714/46 |
| 5,438,674 A * | 8/1995 | Keele et al. ................... 711/4 |
| 5,448,566 A * | 9/1995 | Richter et al. .............. 370/431 |
| 5,702,984 A * | 12/1997 | Bertin et al. .................. 438/15 |
| 6,187,678 B1 * | 2/2001 | Gaynes et al. .............. 438/667 |
| 6,502,213 B1 * | 12/2002 | Bowman-Amuah .......... 714/49 |
| 2005/0002415 A1 * | 1/2005 | Johnson et al. ............. 370/463 |
| 2005/0078835 A1 * | 4/2005 | Baugh et al. ................. 381/61 |
| 2005/0211768 A1 * | 9/2005 | Stillman ..................... 235/381 |

\* cited by examiner

*Primary Examiner*—Thai Phan
(74) *Attorney, Agent, or Firm*—Krish Gupta; Lindsay McGuinness

(57) ABSTRACT

A robust component emulator is provided for use in enclosure testing. Characteristics of the emulator are selected in accordance with the enclosure's view of the component during enclosure testing. Simulating only the subset of component characteristics of interest in enclosure testing allows a low-cost version of the component to be generated, thereby reducing inventory costs associated with testing and removing the need to use actual components during the test process.

16 Claims, 5 Drawing Sheets

COMPONENT EMULATION DEVICE AND METHOD OF DESIGN

FIELD OF THE INVENTION

This invention relates generally to the field of testing and more particularly to an emulation device for use in testing an enclosure.

BACKGROUND OF THE INVENTION

As is known in the art, prior to shipping a computer product to a consumer the computer product typically undergoes a series of tests. The tests generally include diagnostic tests, environmental tests and mechanical tests. The diagnostic tests verify that the computer product is capable of performing each of its purported functions at an expected performance. The environmental tests are performed to ensure that the computer product can perform as expected in the presence of certain environmental conditions, such as extreme temperatures or moisture. The mechanical tests are performed to ensure that the computer product can perform as expected under the application of physical stress. Mechanical tests may include, for example, shock and vibration testing, bump testing or low pressure testing.

During mechanical and environmental testing, the computer product typically executes a set of diagnostic tests while under the environmental or mechanical stresses. Should the computer product fail to pass the diagnostics during these tests, it will not be forwarded to the consumer but rather will be set aside for evaluation and repair.

Many computer system products are generally formed from a number of components that are interconnected via a backplane. Often the backplane is housed in an enclosure, which has a number of interconnects, or slots, for linking the system components to the backplane. In the specification, 'enclosure' is meant to be any type of structure that includes component connectors, and is not limited to enclosed devices. Before a system is shipped both the components and the enclosure must undergo test.

A company can use a common enclosure design to provide a wide range of systems having different capabilities by populating the slots of the enclosure with different numbers and types of components. Such an arrangement allows a consumer to purchase a lower end system, and subsequently upgrade the system by adding components empty slots as the consumers need for capacity and performance increases. Even though an enclosure may be sold to the consumer as part of a partially populated system, it is important that each of the slots of the enclosure be verified as operational so that later upgrades to the system may be performed seamlessly. Therefore the systems are generally tested at full capacity; i.e. as a fully populated enclosure.

Because it is desirable to fully populate an enclosure for testing purposes, an inventory of extra components is maintained in the test lab. Often only a portion of the components that are used to test an enclosure are shipped with the enclosure, while the remaining components are returned to the inventory and used for subsequent tests. It may occur that a given component goes through a testing process numerous times in the process of enclosure testing.

The frequent re-use of components in the enclosure design process may place a significant amount of wear and tear on a component as they are swapped into and out of the enclosure. The added wear and tear may undesirably decrease the available life span of the product before it is shipped to a consumer.

As the component cost and complexity increases, the wear and tear placed on the components may cause the components to become inoperable, and unavailable for shipping with a product. For example rotating magnetic media, such as disk drives, are delicate and may be damaged if pulled out of an enclosure and placed on a bench when the magnetic heads are still rotating. In addition, frequent environmental testing of the disk drive component can adversely affect the distance of the fly height of the head over the magnetic medium. If the effects of testing are significant enough to damage the component, then the component must be removed from the inventory of product available for shipment.

Accordingly there is a cost associated with maintaining an inventory of components for full system testing. In addition to the cost associated with individual component loss, the inventory cost is also increased when enclosures are designed to receive complex and expensive components. Each component that may be included in the system needs to be tested in the enclosure. As individual components are upgraded, the enclosure should be tested using the latest version of the component. Thus a variety of components that are not frequently shipped with the enclosure must be maintained in the inventory. For low margin systems, the breadth of the test inventory undesirably reduces an already low profit margin.

It would be desirable to identify a method and apparatus for testing an enclosure that would reduce the total cost associated with the test process and also the wear and tear on system components.

SUMMARY OF THE INVENTION

According to one aspect of the invention, a robust component emulator is provided for use in an enclosure testing environment. The component emulator is a low cost device having a subset of functional attributes of a corresponding component, the subset selected to enable the emulator to simulate component behavior during diagnostic testing. In addition the component emulator includes a subset of the physical attributes of the corresponding component for simulating component behaviors during environmental and mechanical testing. With such an arrangement, a component emulator may be used in place of actual components for testing a system enclosure. The use of a component emulator, rather than actual components, permits an enclosure to be fully tested without affecting the life span of actual components that are shipped with the product. The costs associated with maintaining an inventory of components for system tests are drastically reduced, as the emulators are robust and unlikely to be damaged by frequent re-use.

According to one aspect of the invention, an emulator of a component for use in testing an enclosure includes a functional component associated with functional attributes of the component exercised during testing of the enclosure and a physical component associated with physical attributes of the component that impact testing of the enclosure.

According to another aspect of the invention, an enclosure capable of interfacing with a component at an interface is provided. The enclosure includes an emulator, coupled to the interface and including a functional component incorporating only the functionality of the component exercised during testing of the enclosure and a physical component incorporating physical attributes of the component that impact testing of the enclosure.

According to a further aspect of the invention, a method of designing an emulator of a component is provided, where the emulator is to be used to test an enclosure. The method including the steps of identifying functional behaviors of the component that are exercised during testing of the enclosure, providing logic, in the emulator, capable of performing the identified functional behaviors, identifying physical attributes of the component that impact testing of the enclosure and packaging the emulator in package having the identified physical attributes.

DETAILED DESCRIPTION

Figure 1B:
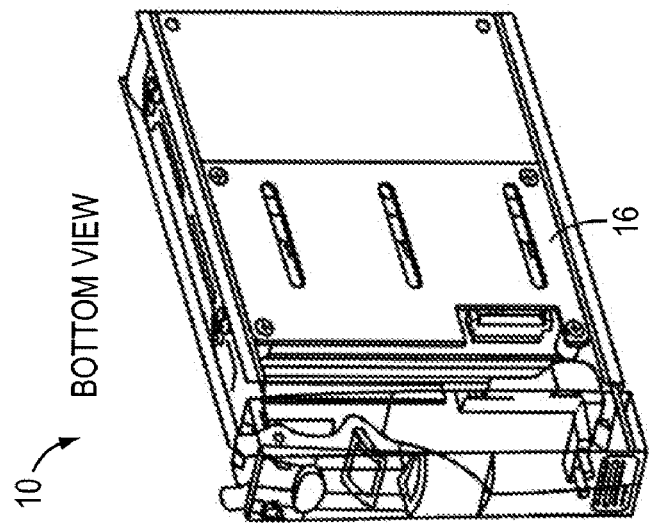
FIGS. 1A-1C are diagrams of several views of a component emulator according to the invention.
Figure 1A:
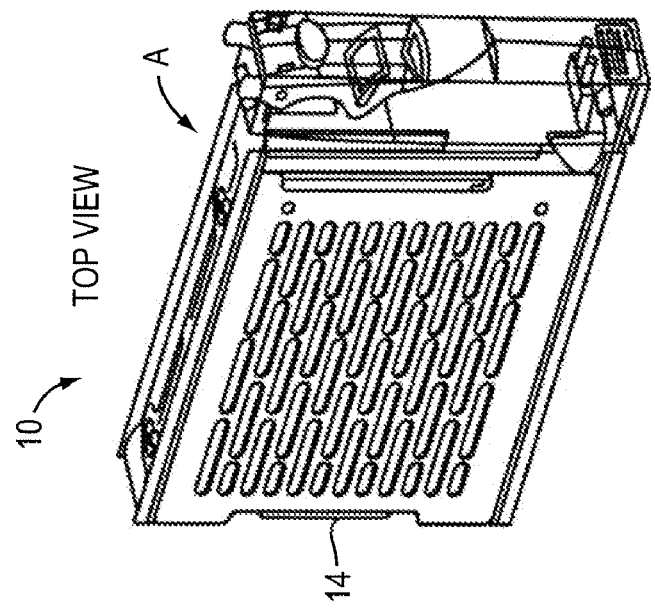

Referring now to FIG. 1A, a view of a top face of a component emulator 10 is shown. In the embodiment illustrated in FIG. 1A, the component that is emulated by the emulator 10 is a disk drive component, however it will be seen that the design principles of the invention may be extended to permit emulation of any component for use in system testing. Accordingly the present invention is not to be limited to the embodiment discussed below.

FIG. 1A illustrates an exemplary external packaging of an emulator. According to one aspect of the invention, the emulator is designed to match the form, fit and feel of the corresponding component. Matching the form and fit of the emulator to the component helps to ensure that air flow and heat dissipation properties of the component are matched by the emulator. To match the form and fit of the component, the emulator has a height h, width w and length 1 which corresponds to a height, width and length of the component emulated. A pin arrangement for a connector 14 on the rear of the package is matched in position and pinout to the connectors of the emulated component. Accordingly, the emulator can be plugged into any slot in an enclosure which is adapted to receive the corresponding component.

Figure 2:
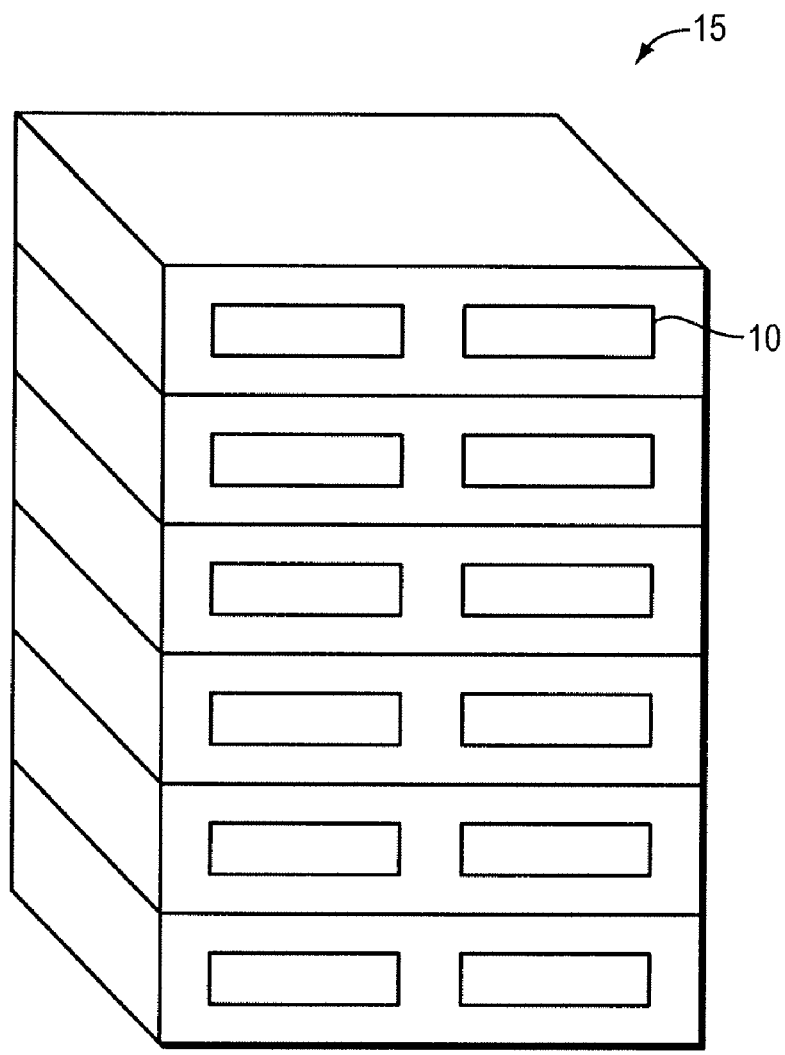
FIG. 2 illustrates a networked storage system enclosure which may incorporate one or more of the component emulators of FIG. 1 during testing.

For example, referring now briefly to FIG. 2, emulator 10, which emulates a disk drive component, is shown inserted into a slot of enclosure 15 for enclosure testing purposes. In the embodiment of FIG. 2 enclosure 15 is one example of a networked storage system, such as the CLARiiON CX500 networked storage system provided by $EMC^2$ Corporation of Hopkinton Mass. The enclosure 15 includes a number of slots, each adapted for specific purposes. A consumer can scale the performance provided by the system by adding or removing components from the slots. Thus, prior to shipment of the system, each slot connection of the enclosure needs to be tested for operability, so that Field Replacement Units (FRUs) may be swapped in an out at a customer site. Note that although it is preferable to use emulators when possible to reduce wear and tear on components, it is not a requirement of the invention, and any arrangement of emulated and non-emulated components can be used for testing an enclosure without affecting the scope of this invention.

Referring back to FIG. 1B, a bottom view of the emulator 10, taken along line A in FIG. 1A is shown to include a shield 16 and a bottom face of a plate 12. In addition to matching the form and fit of the component for purposes of insertion into the slot of the enclosure, according to one aspect of the invention the emulator is also designed to match the feel of the component; where for the purposes of this application the feel includes the weight and weight distribution (i.e., center of gravity) of the component. In one embodiment of the invention, the plate 12 is provided in the emulator to achieve this purpose. The weight and center of gravity of the plate is designed to match the weight and center of gravity of the component. Thus during certain mechanical testing such as shock and vibration testing, the emulator will have a comparable impact on the enclosure as the actual component.

In addition to the weight and weight distribution of the component, other physical attributes of the component are simulated by the plate. For example, the material of the plate 12 is selected to enable the plate to have heat dissipating attributes comparable to that of the emulated component, at the desired weight. Cost also plays a role in the selection of the material for the plate, as it is desirable that the emulator is a low cost alternative to be used in enclosure testing. In one embodiment, the aluminum is selected as the plate material as it satisfies the desired density, heat dissipation and cost goals for simulating the physical attributes of the component, although it is recognized that other materials may be alternatively be used. Thus the present invention is not limited to any particular material selection for the plate.

Figure 1C:
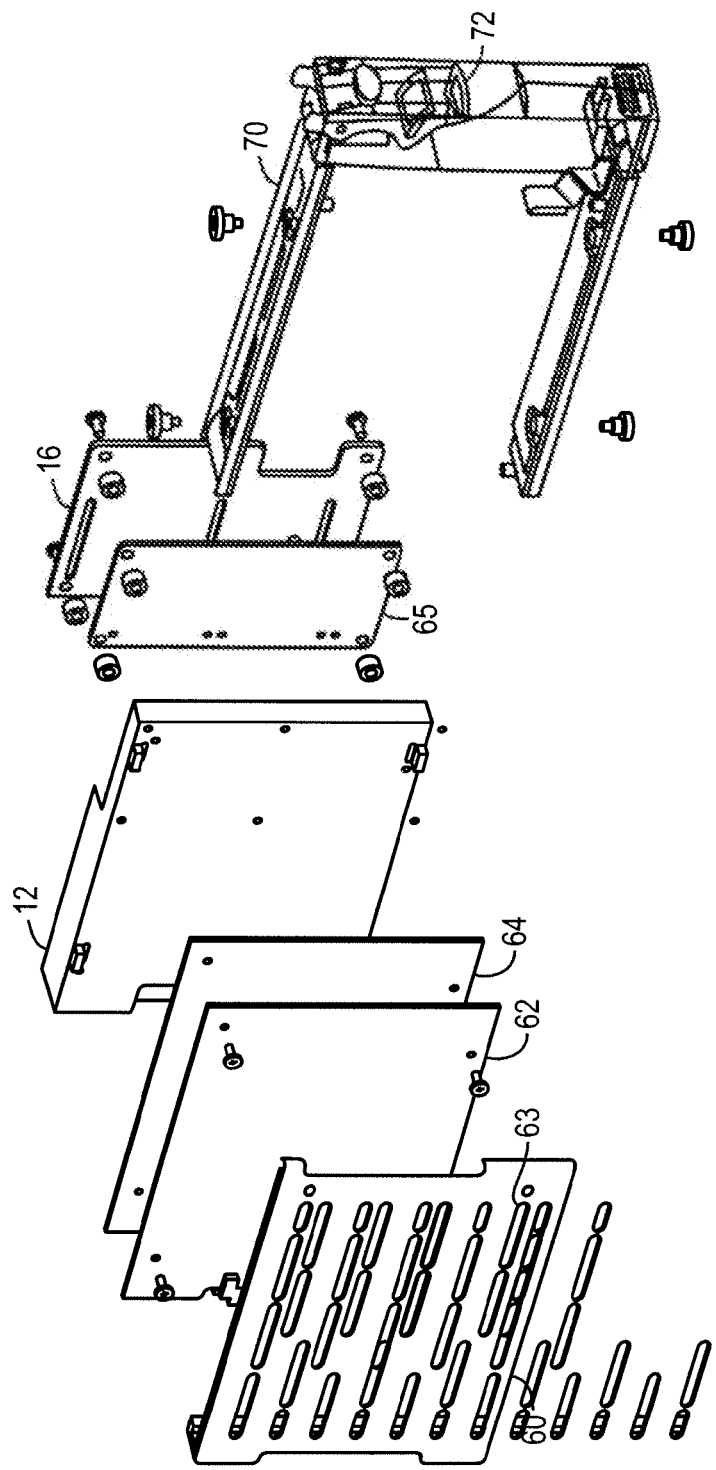

Referring briefly to FIG. 1C, an exploded view of the emulator 10 is shown for the purposes of describing exemplary components that may be included in the emulator. A top plate 60 protects a Printed Circuit Board (PCB) 62, while allowing air flow through slots 63. The PCB 62 includes functionality for supporting the selected set of elements as described below. PCB 62 is sandwiched between the cover 60 and a PCB insulator 64. Plate 12 is coupled to the by PCB shield and connecting plate 14 and 65, respectively to the PCB arrangement 60, 62 and 64. The components are encased in housing 70, which includes a handle 72 to facilitate the addition and removal of the emulator from the enclosure.

Figure 3:
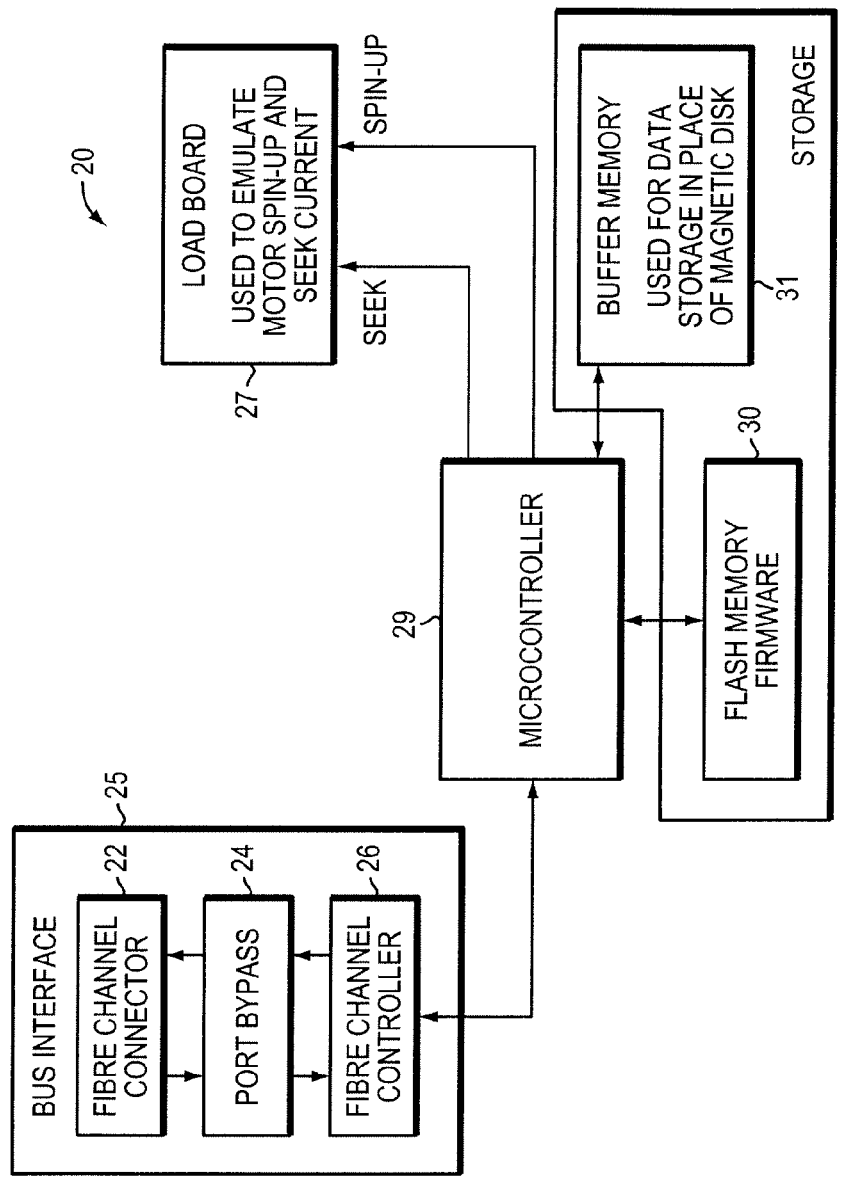
FIG. 3 is a block diagram provided to illustrate several functional components that are included in the component emulator of FIG. 1.

Accordingly it has been shown how the emulator is designed to simulate the form, fit and feel of the component, and how the simulation of these physical characteristics permits the emulator to impact the enclosure in the same manner as the component during enclosure testing. Referring now to FIG. 3, a number of functional components that may be included in the emulator to enable the emulator to simulate the functional capabilities of the component will now be described.

A general goal of the emulator is to provide a version of the component that will act like the component for the purposes of enclosure testing, but will be low cost and robust. Thus, the emulator need not have all the functional capabilities of the actual component, but need have only those capabilities that are tested during the enclosure diagnostics. The enclosure diagnostics generally test the bus interface and data paths between the enclosure and the component, but do not typically test the operational capacity of the component itself; this is done during separate component testing. Thus in general the functionality that needs to be supported by the emulator include those functions needed to exercise the various interfaces of the component. These interfaces include both the signal interfaces and power interfaces.

Thus the typical components that may be included in the emulator include bus interface logic 25 and power interface logic 27. In an embodiment where the emulator simulates a disk drive operating according to the Fibre Channel Protocol, the bus interface logic 25 includes logic which may be included in the component to support this protocol. In FIG. 3 the bus interface logic includes a Fibre Channel Port 22, port bypass 24 and Fibre Channel controller 26.

The typical diagnostic tests that are performed on a disk drive component to exercise the bus include a variety of memory commands such as SEEK, READ, etc. The emulator includes processing logic, such as microcontroller 29, which includes sufficient functionality to recognize component type commands that are used during diagnostics. The microcontroller 29 then controls the exchange of data on the bus to simulate the emulated controller's behavior in response to these commands.

Coupled to microprocessor 29 is storage 33. Storage 33 may include some combination of Read Only Memory (ROM) 30, to store firmware for controlling the microprocessor, and a buffer memory 31 for temporary storage of data. If the component itself was being tested, a variety of different data formats at different sizes would be exchanged to ensure that each sector of the disk drive was operable. However typical testing of the enclosure involves forwarding data blocks between the enclosure and the slot, with the data blocks having certain bit formats that test the signal integrity of the bus connection. Therefore the emulator need include only enough buffer memory to support the size of maximum size of data exchanged between the enclosure and the component during diagnostics.

Thus the microcontroller, bus interface and storage provide sufficient computing resources to simulate the functional behavior of the Fibre Channel bus interface during enclosure testing. In addition, to simulate the functional behavior of the power interface of the component in response to diagnostics, a load board 27 is provided. The load board 27 simulates the power draw behavior of the component in response to diagnostics. For example, during motor spin up and seek, the amount of current drawn by the component increases. It is important to simulate the power behavior during enclosure testing to verify the enclosures' capability of supporting this power draw under stress. The load board 27 operates in response to indications from the microprocessor regarding the operations being simulated, and varies the power draw of the emulator accordingly.

Figure 4:
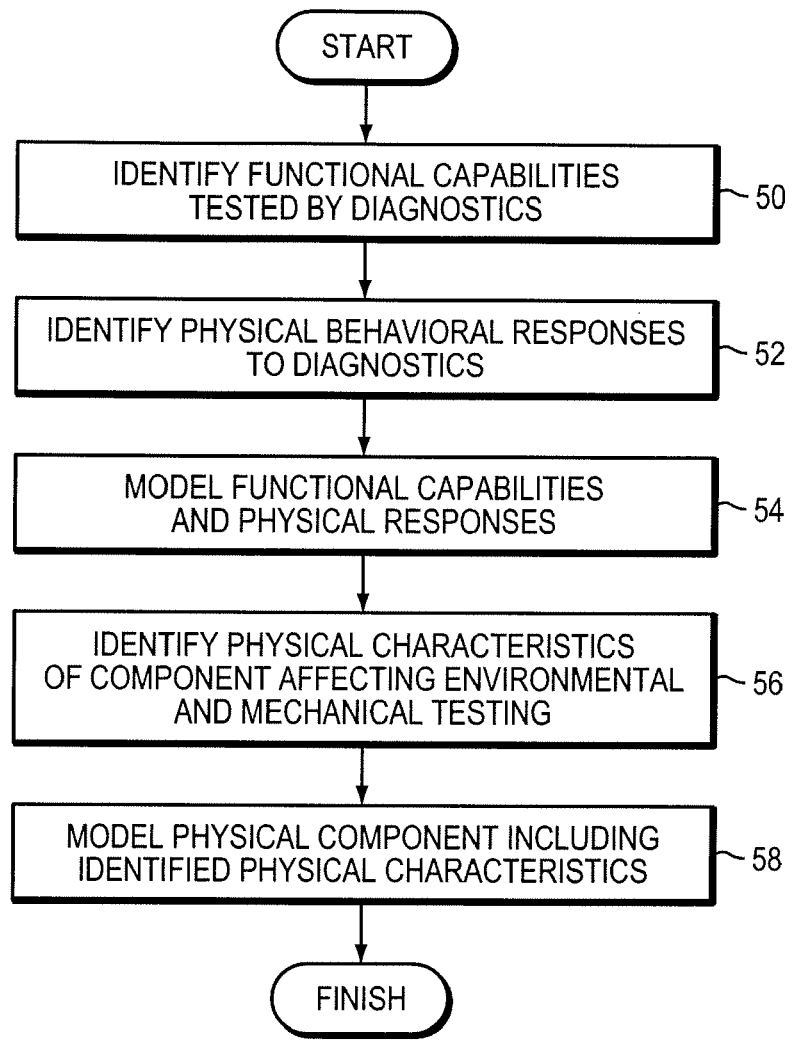
FIG. 4 is a flow diagram including a plurality of exemplary steps that may be performed in designing a component emulator such as that of FIG. 2, to be used in testing an enclosure or backplane.

Thus a number of physical and functional attributes of a component that may be replicated by the emulator have been described. The particular attributes that have been discussed have been described with regard to a disk drive emulator. However, it should be appreciated that the same design process could be applied to emulate different components, depending upon the individual component physical and functional attributes. For example, the process may be applied to design a power supply emulator. The application of this design process to design a power supply emulator will now be described with reference to FIG. 4.

At step 50, the diagnostic tests are examined to identify the functional capabilities of the power supply that are used to test the enclosure. As mentioned above, these functional capabilities generally include bus interface testing; i.e. verifying that the enclosure is capable of exchanging communications with the component. In addition, any behavioral aspects of the component that arise as a result of the exchange of bus interface commands are identified at step 54. At step 56, logical support is provided in the emulator to enable enclosure diagnostic functions to be modeled at each interface of the component.

At step 58 the component package is examined to identify physical attributes of the component that reflect the stresses that the component places on the enclosure during environmental and mechanical testing. Thus, as described with regard to FIG. 1, the form, fit and feel of the component package is characterized. At step 58 the emulator package elements are selected according to the identified component package characteristics.

The above design methodology may be used to provide a low cost, robust emulation of a component which may be used to test and an enclosure. Characteristics of the emulator are selected in accordance with the enclosure's view of the component during testing. Simulating only the subset of component characteristics of interest in enclosure testing allows a low-cost version of the component to be generated, thus reducing the overall inventory costs associated with testing. In addition, the use of an emulator removes the need to use actual components during the test process, thereby reducing component wear and tear. As described with reference to FIG. 4, the design process may be readily adapted to emulate any system swappable component.

The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. An emulator of a component for use in testing an enclosure includes:
    a functional component incorporating functional attributes of the component including only functions exercised during testing of the enclosure; and
    an emulator, coupled to the interface and including a functional component incorporating only the functionality of the component exercised during testing of the enclosure and a physical component incorporating physical attributes of the component that impact testing of the enclosure, wherein the physical attributes include the physical form and fit of the component.

2. The emulator of claim 1, wherein the functional component includes:
    bus interface logic for exchanging commands with the enclosure, the bus interface logic corresponding to bus interface logic of the component;
    processing logic enabling execution of a subset of functionality of the component that is exercised according to a diagnostic test of the enclosure; and
    power supply logic for simulating a power draw profile of the component during the execution of the subset of functionality by the processing logic.

3. The emulator of claim 1 having a physical feel selected in accordance with a corresponding feel of the component.

4. The emulator of claim 1 wherein the physical feel is related to a weight of the component.

5. The emulator of claim 1 wherein the physical feel is related to a center of gravity of the component.

6. The emulator of claim 1 wherein the physical feel is selected according to heat dissipation characteristics of the component.

7. The emulator of claim 1, wherein the component is a disk drive and the functional component includes functionality for exchanging storage protocol transmissions with the enclosure.

8. The emulator of claim 1, wherein the component is a disk drive and the physical attributes correspond to the packaging attributes of a disk drive.

9. An enclosure capable of interfacing with a component at an interface, the enclosure including:
  an emulator, coupled to the interface and including a functional component incorporating only the functionality of the component exercised during testing of the enclosure and a physical component incorporating physical attributes of the component that impact testing of the enclosure, wherein the physical attributes include the physical form and fit of the component.

10. A method of designing an emulator of a component, the emulator to be used to test an enclosure, the method including the steps of:
  identifying functional behaviors of the component that are exercised during testing of the enclosure;
  providing logic, in the emulator, capable of performing only the identified functional behaviors;
  identifying physical attributes of the component that impact testing of the enclosure, wherein the physical attributes include the physical form and fit of the component; and
  packaging the emulator in package having the identified physical attributes.

11. The method of claim 10 wherein the functional behaviors include bus protocol behaviors.

12. The method of claim 10 wherein the functional behaviors include power consumption behaviors.

13. The method of claim 10 wherein the physical attributes include the physical feel of the component.

14. The method of claim 10 wherein the physical attributes include the weight of the component.

15. The method of claim 10 wherein the physical attributes include the center of gravity of the component.

16. The method of claim 10 wherein the physical attributes include the heat dissipation properties of the component.

* * * * *